(12) United States Patent
Burnett et al.

(10) Patent No.: US 7,475,077 B2
(45) Date of Patent: Jan. 6, 2009

(54) SYSTEM AND METHOD FOR EMULATING A VIRTUAL BOUNDARY OF A FILE SYSTEM FOR DATA MANAGEMENT AT A FILESET GRANULARITY

(75) Inventors: Rodney Carlton Burnett, Austin, TX (US); Jonathan M. Haswell, Tucson, AZ (US); Tewari Renu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 11/345,137

(22) Filed: Jan. 31, 2006

(65) Prior Publication Data
US 2007/0179991 A1 Aug. 2, 2007

(51) Int. Cl.
*G06F 17/30* (2006.01)
(52) U.S. Cl. .................. 707/10; 707/205; 707/201; 711/100; 709/213
(58) Field of Classification Search .............. 707/10, 707/205, 201; 711/100; 709/213
See application file for complete search history.

(56) References Cited

U.S. PATENT DOCUMENTS

| 5,566,328 | A | | 10/1996 | Eastep | |
|---|---|---|---|---|---|
| 5,918,229 | A | * | 6/1999 | Davis et al. | 707/10 |
| 6,330,572 | B1 | * | 12/2001 | Sitka | 707/205 |
| 6,347,397 | B1 | * | 2/2002 | Curtis | 717/170 |
| 2003/0135511 | A1 | | 7/2003 | Anderson et al. | |
| 2003/0158862 | A1 | | 8/2003 | Eshel et al. | |
| 2003/0182312 | A1 | | 9/2003 | Chen et al. | |
| 2003/0182322 | A1 | * | 9/2003 | Manley et al. | 707/201 |
| 2004/0098415 | A1 | * | 5/2004 | Bone et al. | 707/200 |
| 2004/0107222 | A1 | | 6/2004 | Venkatesh et al. | |
| 2005/0010620 | A1 | * | 1/2005 | Silvers et al. | 707/205 |
| 2005/0114261 | A1 | * | 5/2005 | Lin | 705/40 |
| 2005/0273451 | A1 | * | 12/2005 | Clark et al. | 707/1 |

* cited by examiner

*Primary Examiner*—Khanh B. Pham
*Assistant Examiner*—Syling Yen
(74) *Attorney, Agent, or Firm*—Shimokaji & Associates, PC.; Samuel Kassatly

(57) ABSTRACT

A file system boundary emulation system emulates a virtual boundary of a filesystem within an existing file system for data management at a fileset granularity, within the framework of a wide area filesystem federation. The system dynamically assigns a fileset ID to the file that belongs to that fileset. The system comprises a fileset defined by the virtual boundary of the file. The virtual boundary is less than and contained within the file system. The fileset identifies the file via the file ID and the fileset ID. The system maps the file ID to the fileset ID. The filesets are dynamically created and removed based on administrative instructions. Filesets are used for fine grained data management and namespace control in a filesystem federation.

5 Claims, 6 Drawing Sheets

SYSTEM AND METHOD FOR EMULATING A VIRTUAL BOUNDARY OF A FILE SYSTEM FOR DATA MANAGEMENT AT A FILESET GRANULARITY

FIELD OF THE INVENTION

The present invention generally relates to file systems and in particular to federated file systems. More specifically, the present invention relates to a system that emulates a filesystem boundary within a general purpose filesystem that is exported via a network file sharing (NFS).

BACKGROUND OF THE INVENTION

As enterprises move toward distributed operations spread over several remote locations, multi-site collaboration and joint product development becomes increasingly common. Although this technology has proven to be useful, it would be desirable to present additional improvements. Distributed operations require data sharing in a uniform, secure, and consistent manner across the enterprise acceptable performance. While large amounts of data can be easily shared on a local-area network (LAN) using standard file access protocols, these mechanisms do not scale well when extended to remote offices connected over a wide-area network. Moreover, deployment of alternate solutions such as a wide-area filesystems geared for global scalability is rarely chosen by enterprises; the cost of maintaining and operating one or more filesystems and protocols for local and wide-area access and integrating data between them can be prohibitive.

Data and file sharing has long been achieved through traditional file transfer mechanisms such as file transfer protocol (FTP) and distributed file sharing protocols such as network file sharing (NFS) and common Internet file system (CIFS). The file sharing protocols tend to be "chatty", having been designed for local area network (LAN) environments where clients and servers are located in close proximity.

Data sharing can also be facilitated by a clustered filesystem. While clustered filesystems are designed for high performance and strong consistency, they are neither inexpensive nor easy to deploy and administer. Other filesystem architectures attempted to solve the file sharing issues of a wide area network through a distributed architecture that provides a shared namespace by uniting disparate file servers at remote locations into a single logical filesystem. However, these technologies incur substantial deployment expense and have not been widely adopted for enterprise-wide file sharing.

One conventional approach comprises the Andrew file system (AFS), which is a globally distributed filesystem. AFS introduces the concept of a cell as an administrative domain and supports a global namespace. AFS also introduces the volumes as an abstraction for data management. AFS has extensive client-side file caching for improving performance and supports cache consistency through callbacks. AFS further allows read-only replication useful for improving performance.

Another conventional approach comprises most of the features of AFS but is also integrated with the Open Software Foundation (OSF) common desktop environment (DCE) platform. This conventional approach provides improved load balancing and synchronization features along with transparency across domains within an enterprise for easy administration. Other AFS-related filesystems deals with replication for improved scalability while focusing on disconnected operations.

Recently there has been some work on leveraging the features of NFSv4 to provide global naming and replication support. One conventional approach focuses on providing a global namespace and read-write replica synchronization. Other related efforts are geared toward improving performance by using parallel data access.

Orthogonal to the distributed file system work, there have been a number of conventional approaches utilizing clustered filesystems. These conventional approaches are geared for high-performance solutions using high-speed network connections and tightly coupled servers.

Additional conventional technologies have explored grouping together servers for a common file service. One conventional approach decentralized the storage services across a set of cooperating servers in a local area environment. In contrast, another conventional approach comprises an archival system, aimed at storing huge collections of data using worldwide replica groups with security and consistency guarantees. Yet another conventional approach focuses on security and byzantine faults, where a loose collection of untrusted, unsecured servers are grouped together to establish a virtual file server that is secure and reliable. A further conventional approach couples islands of data for scalable Internet services.

The need, therefore, is not to build yet another globally distributed filesystem but to group together a set of heterogeneous, multi-vendor, independent, and distributed file servers such that the distributed file servers act as one. It is desirable that data remain where it is, possibly in legacy filesystems or on a variety of single server filesystems. Instead, a system is needed that allows clients to seamlessly navigate the data without additional client-side software or configuration and manage the data at fine granularities for replication, migration and caching. The data management in conventional methods is done at the whole filesystem granularity.

What is therefore needed is a system, a computer program product, and an associated method for emulating a virtual boundary of a file system for data management at a finer fileset granularity. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for emulating a virtual boundary of a file system for data management at a fileset granularity, providing flexible data management within a wide area filesystem federation. The present system dynamically groups a directory tree and all files and directories within it into a fileset and assigns a fileset ID to the fileset. The present system comprises a fileset defined by the virtual boundary of the filesystem. The virtual boundary is less than and contained within the file system and can be created without any support from the underlying filesystem. In this system, a file or directory contained in a fileset is uniquely identified via the file ID and the fileset ID and the filesystem id. The present system can efficiently map the file ID to the fileset ID it belongs to. The filesets are dynamically created and removed based on administrative instructions. System 10 uses the fileset to generate a virtual boundary for more efficient data management.

The present system provides distributed file access across Internet-scale networks, networks that exhibit limited bandwidth, high latency, and low reliability; the present system provides the distributed file access by exporting filesets. The present system provides these services using a unified administration and security model. All administration of the present system can be performed from a single interface regardless of the scale of the implementation. The present system further comprises features found in conventional distributed filesystems that facilitate data management and provide a unified namespace (further referenced herein as a server set Namespace and a root namespace) to ease client access.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Cell: A unit of administration for a collection of servers and their filesystems.

Federation: A collection of cells that are part of the common namespace.

Fileset: A unit of data management. A container of data which could range from a single leaf directory to a directory tree within a filesystem containing all the files and subdirectories within it.

Figure 1:
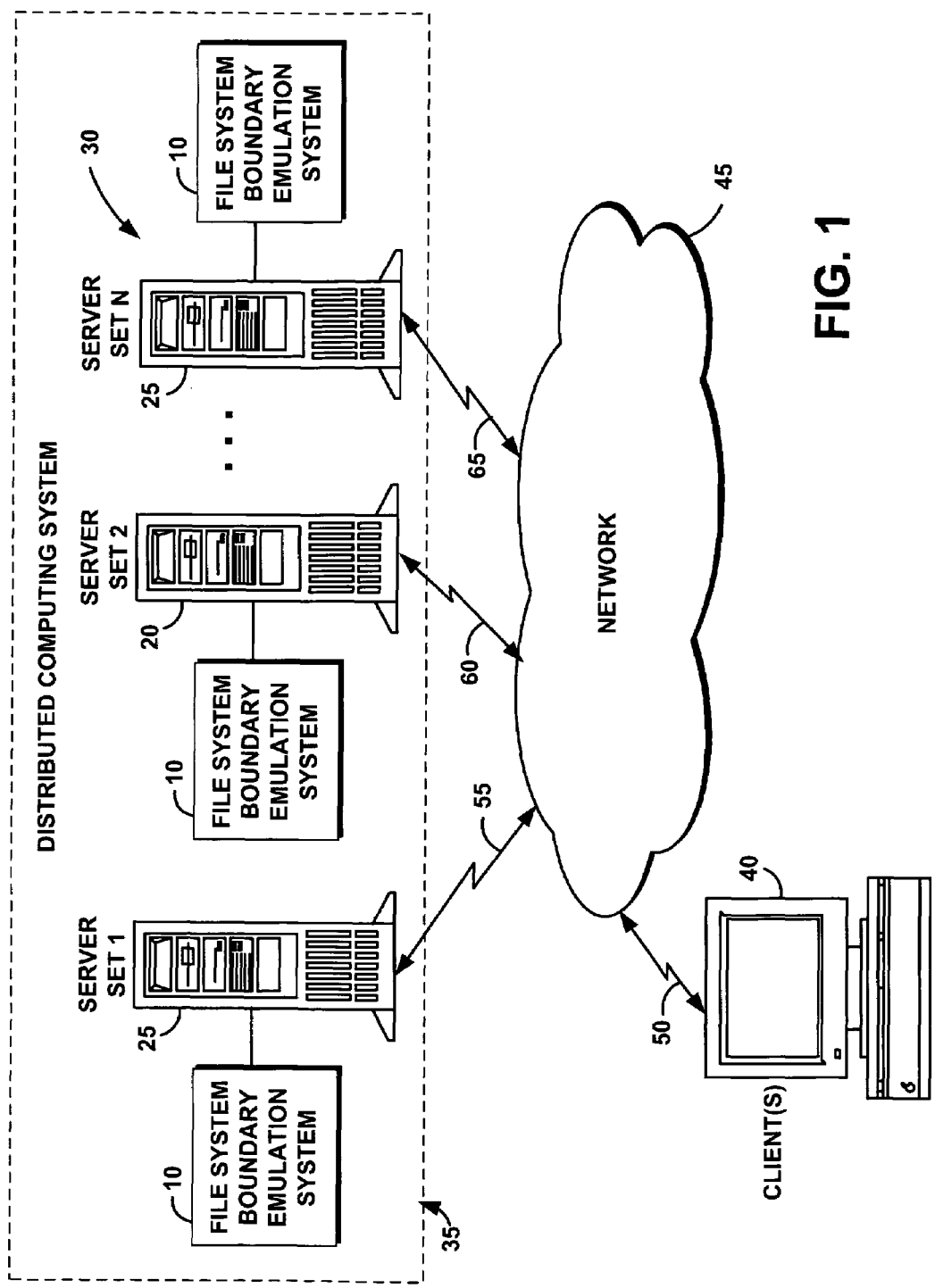
FIG. 1 is a schematic illustration of an exemplary operating environment in which a file system boundary emulation system of the present invention can be used.

FIG. 1 portrays an exemplary overall environment in which a system, a service, a computer program product, and an associated method (the "file system boundary emulation system 10" or the "system 10") for emulating a virtual boundary of a file system for data management at a fileset granularity. System 10 comprises a software programming code or a computer program product that is typically embedded within, or installed on a server set 1, 15, a server set 2, 20, through a server set N, 25 (collectively referenced as server sets 30). Alternatively, system 10 can be saved on a suitable storage medium such as a diskette, a CD, a hard drive, or like devices.

A distributed computing system 35 comprises the server sets 30. Each of the server sets 30 may represent one server, a cluster of servers, or one or more server cells. At least some of the server sets 30 may be co-located or geographically dispersed. For example, server set 1, 15, may be based in Tokyo, Japan; server set 2, 20, may be based in San Francisco, Calif., and server set N, 25, may be based in Boston, Mass.

Clients represented by client 40 can access the distributed computing system 35 through a network 45. Client 40 is connected to network 45 via a communications link 50 such as a telephone, cable, or satellite link. Server set 1, 15, server set 2, 20, through server set N, 25 can be connected to network 45 via communications link 55, 60, 65 respectively. While system 10 is described in terms of network 45, client 15 may also access the distributed computing system 35 locally rather than remotely.

The primary organizational unit of system 10 is a cell. System 10 comprises objects such as filesets, fileset locations, and a root namespace (further referenced herein as a namespace, a server set Namespace, and a shared namespace). Each of these objects is associated with a cell. Cells are independent and non-interacting with each other so that a single organization can create cells in a way that best meets their business needs of security and performance. Cells can be as small as a workgroup or as large as an enterprise.

The cell is a logical construct. System 10 allows one or more cells to be serviced by a single host server within each of the server sets 30. System 10 maintains all the information necessary to manage filesets. Cells provide a range of other services comprising security and automation. Cell services maintain security by allowing the authorization of users and groups as well as adding and removing data servers. System 10 provides automation services to facilitate maintenance of filesets such as, for example, the scheduled update of a fileset replica from a source fileset.

Figure 2:
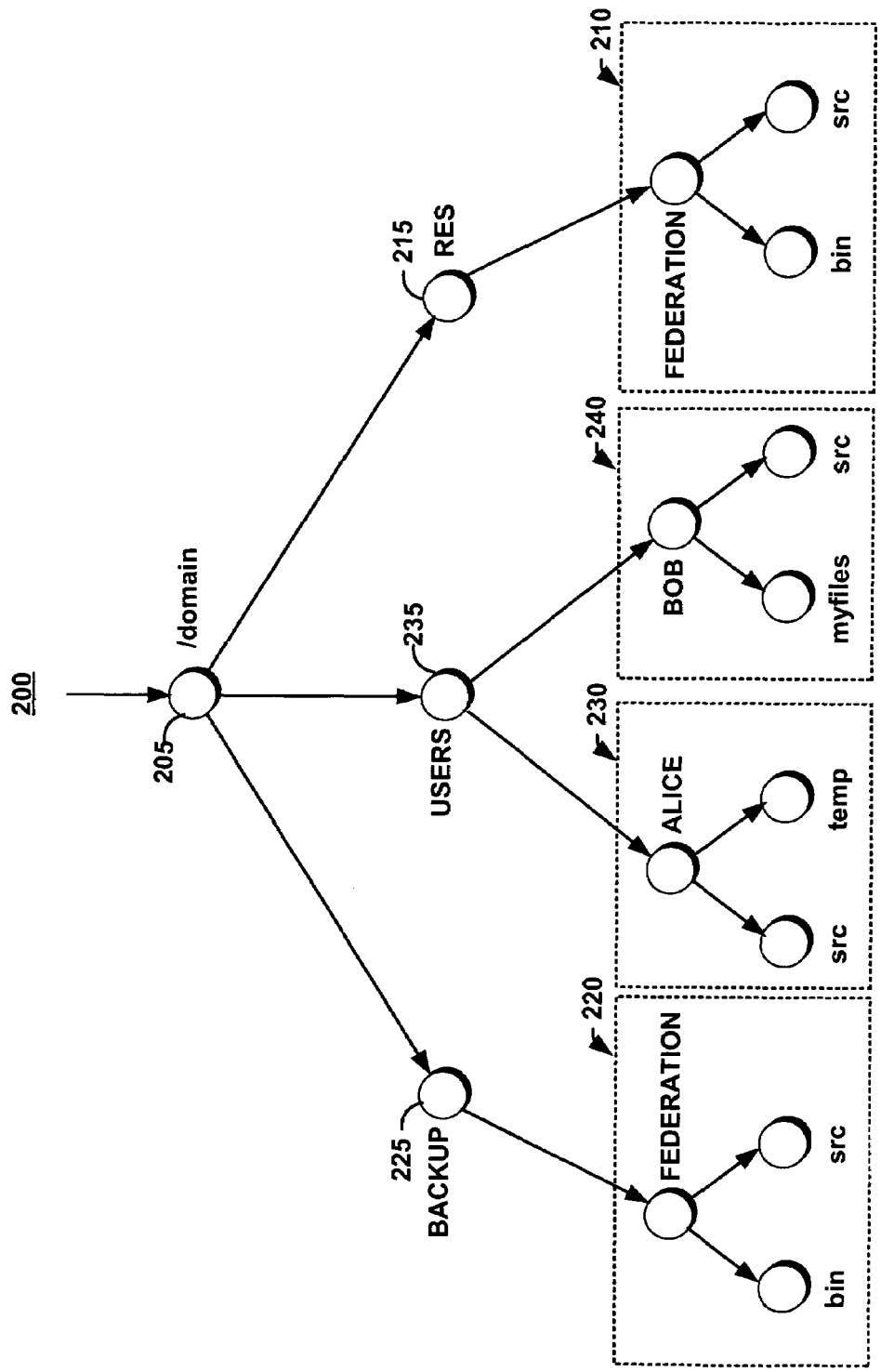
FIG. 2 is an exemplary directory generated in a shared namespace by the file system boundary emulation system of FIG. 1.

FIG. 2 illustrates a root namespace 200 generated by system 10 under a root node /domain 205 as a shared namespace. In the root namespace 200, server set 1, 15, exports a local directory such as /project/federation as a fileset that is replicated at server set 2, 20. Server set 2, 20, exports a local directory such as /home/alice as a fileset. Server set N, 25, exports a local directory such as /home/bob as a fileset. System 10 attaches the exported filesets to the root namespace 200. The root namespace 200 is available for traversal by clients such as client 40. The filesets exported by server set 1, 15, is represented by a federation directory 210 under a node 215. The /project/federation fileset replicated at server set 2, 20, is represented by a federation directory 220 under a node backup 225. The local directory for server set 2, 20, is represented by an alice directory 230 under a node users 235. Similarly, the local directory for server set N, 25, is represented by a bob directory 240 under the node users 235.

Figure 3:
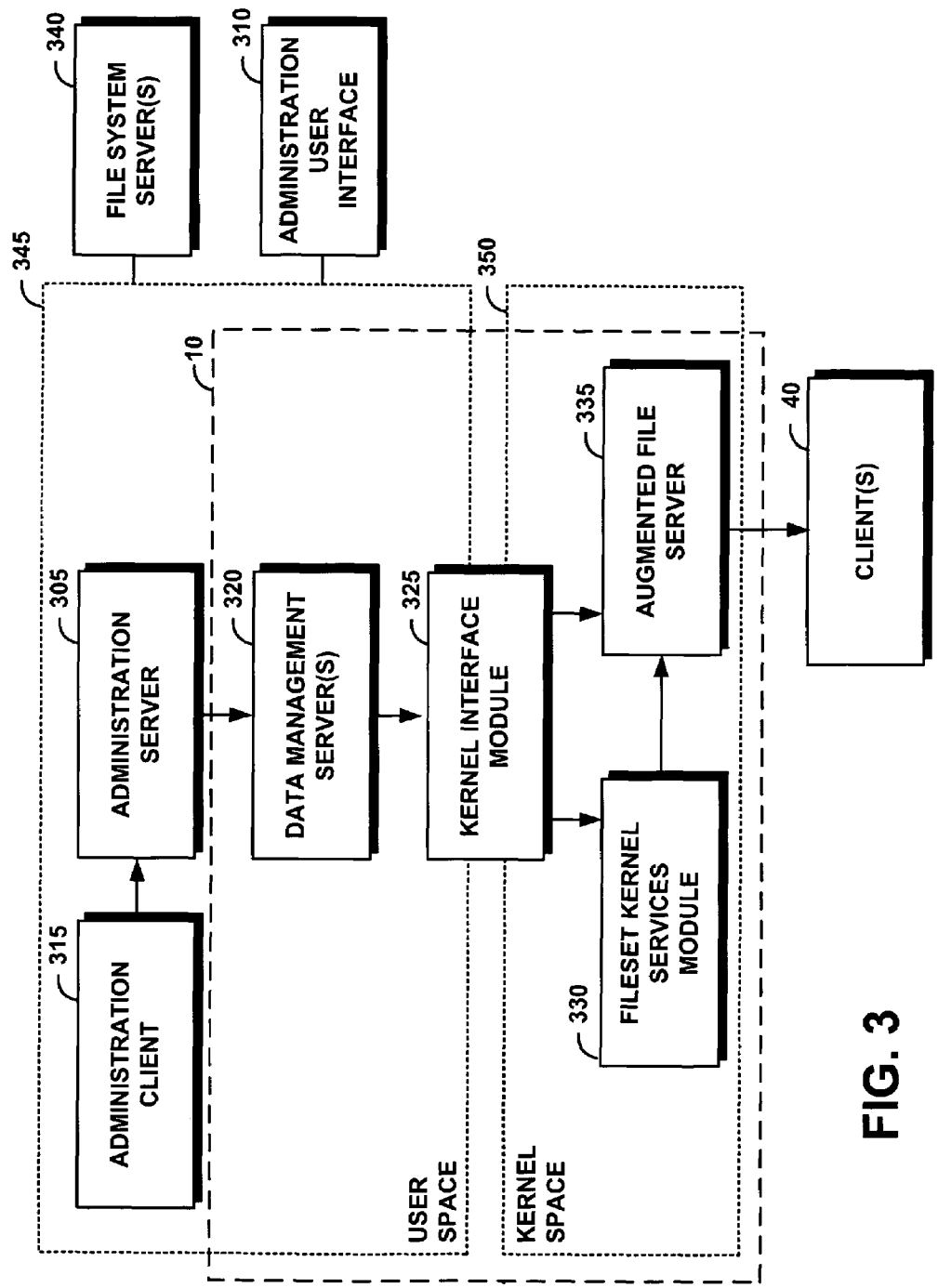
FIG. 3 is a block diagram of the high-level architecture of the file system boundary emulation system of FIG. 1.

FIG. 3 illustrates a high-level architecture of system 10. Each of the server sets 30 comprises an administration server 305, an administration user interface 310, and an administration client 315. System 10 comprises one or more data management servers 320, a kernel interface module 325, a fileset kernel services module 330, and an augmented file server 335. The administration server 305, the administration user interface 310, the administration client 315, and the kernel interface module 325 operate in user space 345. The kernel interface 325, the fileset kernel services module 330, and the augmented file server 335 operate in kernel space 350.

System 10 organizes files in a hierarchical container structure such that files appear inside directories. Directories may comprise files and directories. To extend boundary crossings to include a fileset boundary, without any underlying physical filesystem support, system 10 maintains a minimal state outside a physical filesystem support. System 10 maintains a state of the fileset via an in-kernel database of fileset directories indexed by the physical filesystem generated "file ID".

System 10 identifies a file within a filesystem via the file ID and the fileset ID. System 10 further maps the file ID to the fileset ID using the in-kernel database. System 10 further maintains the state of the database by extending an opaque file system filehandle to contain a "fileset ID". The database identifies specific directories and contents of the directories. The database further identifies one or more files or one or more additional directories within the specific directory.

By carrying the fileset information in the filehandle, system 10 does not need to crawl the filesystem to identify a fileset to which a file or directory belongs. When a directory is upgraded to be fileset, an in-kernel database records the entry in a table mapping the directory file ID to a "fileset ID". This fileset ID is piggy-backed with the filehandle and used for subsequent requests. The filehandle structure contains the filehandle as shown below:

```
struct rfs4_fh {
    fsid4 fsid;
    struct fileid fileid;
    ...
    dsid_t fileset_id;
    dsgen_t fileset_gen;
```

The filehandle is opaque to client 40, implying that any file can be identified by a tuple comprising the file system ID and the file handle. If client 40 wishes to read a file, the augmented file server 335 gives the client 40 filehandle. The augmented file server 335 parses the filehandle to obtain the file ID and the fileset ID. The client 40 does not have to retrieve the file system ID from the database, this information is provided in the file handle.

An instance of the data management server 320 and the fileset kernel services module 330 operate on any server in the server sets 30 that provide file services. The administration server 305 communicates with the data management server 320. In one embodiment, the administration server 305, the administration user interface 310, the administration client 315, the data management server 320, the kernel interface module 325, the fileset kernel services module 330, and the augmented file server 335 may operate on a single server in each of the server sets 30.

System 10 facilitates fault tolerance by making each data server in the server sets 30 independent of each other. Inter-server communication occurs via reliable queues that can hold messages in case a data server fails or a network partition occurs. When the data server is restored or the partition is healed, the queued messages are sent, bringing the data server back to full currency.

The administration server 305 is not duplicated in system 10 and can be run on a server configured for high availability for added reliability. System 10 data services run independently of the administration server 305. If the administration server 305 fails or a network partition causes communication with the administration server 305 to be lost, all data services are still available. However, administration functions cannot be performed until the administration server 305 is restored or the network healed.

The architecture of system 10 supports one or more cells. System 10 administers cells through the administration user interface 310. Each data server can hold filesets for additional servers and an administration server can be used to configure additional cells. Consequently, cells can be relatively lightweight, making the cells more useful and more configurable to application needs. Creating a new cell for administration and security purposes does not require new hardware.

Kernel services provided by the fileset kernel services module 330 are generally implemented as loadable kernel modules. The fileset kernel services module 330 implements functions for filesets, e.g., create, modify, etc. These services are implemented via native filesystem calls for each operating system. These file services are generally called from a file system server 340 and the data management server 320, described as follows.

In one embodiment, the file system server 340 is a modified standard NFS server supporting version 4 (NFSv4) of the NFS protocol. While system 10 is described for illustration purpose only in relation to an NFS file server, it should be clear that the invention is applicable as well to, for example, any type of file server. The file system server 340 is modified to be fileset-aware and to maintain the state necessary to implement fileset semantics (comprising additional locations, failover, etc.) in a manner invisible to client 40.

The file system server 340 queries the fileset kernel services module 330 to determine fileset information such as boundaries, identifiers, etc. The file server further queries the data management server 320 via the kernel interface module 325 to resolve client requests for fileset location information.

The data management server 320 runs on each host in a cell providing file services. The data management server 320 responds to requests from the administration server 305 to execute fileset operations. In response, the data management server 320 maintains a small local database of configuration information and uses the fileset kernel services module 330 via the kernel interface module 325 to perform fileset operations. The data management server 320 communicates with other instances of the data management server 320 in a cell to perform fileset motion operations. The data management server 320 further responds to a request, generally from the file system server 340 via the kernel interface module 325, to look up locations for given filesets.

The administration server 305 provides a point of coordination for administration functions performed by system 10. The administration server 305 maintains a complete database of all configurations of a cell and information within the cell, including servers, filesets, locations, users, groups, automation jobs, etc.

The administration server 305 receives user requests and takes the appropriate action, updating the local database of the administration server 305 and forwarding commands to the associated data management servers in the cell. All communications by the administration server 305, both with the administration client 315 and the data management servers 320, are implemented via a purpose-built protocol.

Administrative action occurs via the administration client 315 that communicates with the administration server 305. In one embodiment, the administration client is implemented as a command line interface (CLI) that encodes and decodes user commands for processing by the administration server 305.

Storage management of system 10 utilizes filesets in the context of distributed filesystems to sidestep limitations of storage management at the filesystem level. A fileset can be viewed as a storage abstraction somewhere between a filesystem and a directory. Like a filesystem, a fileset "owns" its contents and therefore copying a fileset implicitly copies its contents. However, unlike a filesystem, a fileset does not "own" free space. Filesets allocate and free space for files and directories from one or more backing filesystems.

A fileset is a lighter weight object than a filesystem. The fileset is not tied to a particular operating system device and can be moved from one filesystem to another relatively easily. Whereas a server generally has a small number of filesystems, the number of filesets a single filesystem can hold is limited only by the size of the filesystem and the sizes of the filesets themselves. A fileset can be as small as a single empty directory or as large as an entire filesystem.

Generally, filesets are created to represent a semantic storage relationship. For example, every user can have their home directory in a unique fileset, regardless of size. Because filesets have low overhead, there is little penalty for creating a large number of filesets. Filesets can also be easily created, destroyed, and moved. The analogous filesystem operations are heavy weight. Some operations on filesets (i.e., promoting an existing normal directory to a new fileset) have no filesystem analog.

Figure 4:
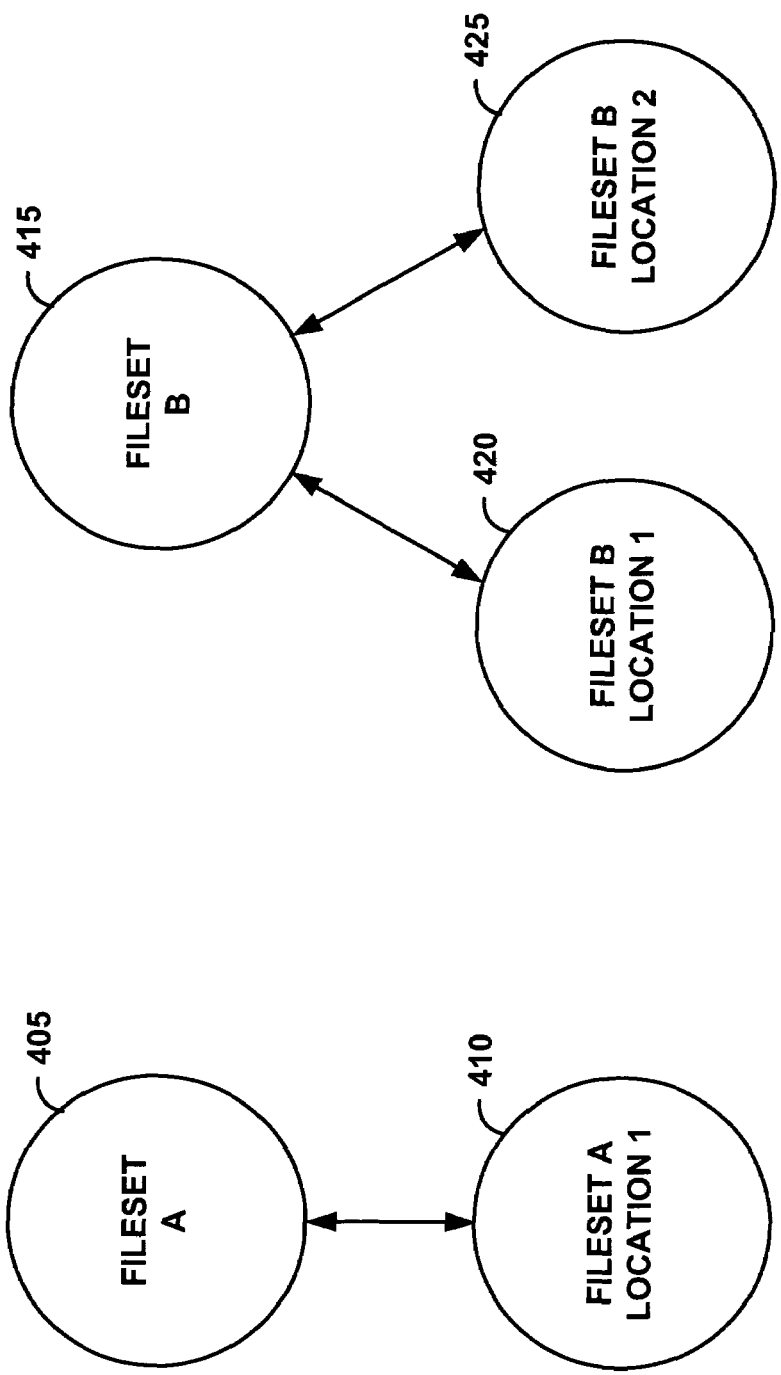
FIG. 4 is a diagram illustrating filesets and fileset locations of the file system boundary emulation system of FIGS. 1 and 3.

System 10 comprises filesets that are implemented as related objects. These related objects comprise a fileset object and a fileset location object, as illustrated in FIG. 4. The data for a fileset is stored in one or more locations. In the simplest case, a single location exists for a fileset; thus, the distinction between a fileset and its location is blurred. An example of this case is shown in FIG. 4: fileset A, 405, has one location shown as fileset A location 1, 410. However, filesets can have additional (identical) locations as illustrated with a fileset B, 415. Fileset B, 415 has two identical locations, a fileset B location 1, 420, and a fileset B location 2, 425. When a fileset comprises additional locations, all locations are identical and can be used interchangeably.

Locations are usually spread across two or more servers. Having locations on two or more servers opens up opportunities for added value. For example, the present system enables higher throughput. Adding servers can spread the client load spread across more computing and storage resources. The present system further reduces latency. If locations are placed on geographically distributed servers, similarly distributed clients observe improved latency. The present system improves reliability. With two or more servers and automatic failover, tolerance of machine crashes and regional disasters is achieved.

System 10 comprises read-write filesets and read-only replica filesets. Read-write filesets generally have a single location (unless created in a clustered filesystem environment) and can be read and written by additional clients in a manner similar to a conventional filesystem. A read-only replica of a fileset is created through replication of another fileset at a particular point in time. Referring back to FIG. 4, fileset B 415 is created as a replica of fileset A 405. The contents of fileset B 415 reflect the contents of fileset A 405 when the replica is created. Subsequent changes to fileset A 405 are not reflected in any location of fileset B 415 until a replica update operation is requested, either manually through the administration user interface 310 or through automation provided by system 10.

Filesets become visible to clients once the filesets are mounted. Filesets are mounted on an existing directory in an existing fileset. When mounting a fileset, system 10 creates a special object called a "referral".

Each server comprises a special filesystem that provides the root of the namespace of the filesystem for local file access. System 10 provides a root namespace that serves a similar function for system 10 services. Details of this namespace are described below.

Mount operations of system 10 differ from conventional filesystem mounts. Mount operations of system 10 are persistent; i.e., mounts survive a system reboot. System 10 is a distributed, multi-server system for which the impact of individual system failures is minimal. Filesets of system 10 can be mounted more than once in additional places within the namespace. Since mount points of system 10 are lightweight, there is no penalty in allowing additional mounts.

Filesets are mounted rather than locations. It is the responsibility of the administration server 305 and client 40 to determine an optimum location for accessing data for a fileset with additional locations.

System 10 further introduces a concept of an external mount point. The external mount point represents mounting a filesystem that does not comprise system 10 within a fileset. System 10 provides the services necessary to create and recognize the mount point that causes the client to attempt to fetch the data from the external server. System 10 does not manage this external data in any way and cannot verify the availability or validity of the target data.

Once created and mounted, filesets appear to clients as normal directories, with some restrictions. For example, a fileset cannot be destroyed via an rmdir command.

In addition to common filesystem operations, system 10 provides a number of operations specifically applicable to filesets. These operations comprise for example, a place operation, a promote operation, a demote operation, a migrate operation, and a snapshot operation.

An existing fileset can have an additional location created through the place operation with the restrictions previously mentioned regarding read-write filesets and cluster filesystems. The place operation indicates to the server where the new location is created. Additional locations for the same fileset can be placed on the same server, which can, in some cases, improve performance.

An existing directory with existing content, either within an existing fileset or not within an existing fileset, can turned into a fileset via the promote operation. Similarly, a fileset location can be demoted back to a normal directory using the demote operation.

Locations of filesets can be migrated from one server to another using the migrate operation. Migrating a location is similar to creating a new location and removing an old location but is performed in such a manner that no client disruption occurs.

The snapshot operation forms a "snapshot" of a fileset; i.e., using the snapshot operation, system 10 generates a consistent copy at a point in time. System 10 facilitates the snapshot operation but requires support from underlying filesystems. Otherwise, all copies are not made consistently; i.e., changes can occur during the time it takes services of system 10 to walk the contents of a fileset.

System 10 facilitates fileset organization by providing a common root namespace that all clients see. The root namespace contains no data and serves as a place to mount other user-created filesets. All clients share the root namespace. The scope of the namespace as well as other objects generated by system 10 are described below.

System 10 provides added value to the infrastructure of a file system such as, for example, NFSv4, without enforcing additional requirements. For example, an existing NFSv4 server can be added to a cell of system 10 without disrupting any preexisting normal NFSv4 services that the NFSv4 server was providing.

When a file server is added to a cell, system 10 places a copy of the namespace of the cell on the added file server and exports the namespace as "/cellname". A client need only mount the cell (or the root of the server pseudo-filesystem, if desired) to access any data within the cell, regardless of where the data resides.

System 10 can fit within a global namespace (i.e., a namespace that crosses all organizational boundaries such as, for example, a web URL), managing data once a directory level suitable for a cell is traversed.

The data management framework of system 10 seamlessly replicates, migrates, and navigates through filesets distributed across a federation of a wide-area distributed network. In one embodiment, the fileset abstraction of system 10 is supported by an underlying physical filesystem. With native physical filesystem support, a fileset appears as a filesystem from the client and server perspective except that the fileset masquerading as a filesystem can appear and disappear. In another embodiment, adding a virtualization layer to system 10 supports filesets. The virtualization layer requires support in the operating system for fileset management and hooks in the administration server 305 to query the virtualization layer for fileset information.

As client 40 traverses the server set Namespace, client 40 requires detection of filesystem transition (crossing mount points) to, for example, obtain replica locations and other meta-data information. In the absence of filesets, the client typically detects a filesystem boundary when the value of a file server ID (fsid) attribute returned by the administration server 305 changes during traversal. Each filesystem returns a unique file server ID value that, in most cases, is based on the device major and minor numbers of the underlying device. Supporting fine-grained filesets requires support from the underlying filesystem to return a unique file server ID value per fileset.

From a perspective of client 40, fileset boundaries are defined by changes in values of the file server ID. System 10 adds one or more hooks in the administration server 305 to query system 10 and returns a different file server ID per fileset. In one embodiment, a simple mapping table between the fileset boundary and a virtual file server ID is used. Every object within the fileset returns the same file server ID on a client's get file attribute (GETATTR) request. In this approach, system 10 tracks every object in the mapping table and monitors the objects as the objects are created and deleted.

In another embodiment, system 10 walks up a directory tree (by looking up ". . . ") on each GETATTR request to determine if any ancestor directory is a fileset boundary. This approach works for directories with significant overheads but is not adequate for files. Given a filehandle in a request by client 40, the administration server 305 may be unable to determine the directory containing the file, especially in the presence of hard links.

System 10 is scalable and requires minimal state to be maintained while adding only nominal performance overhead. The fileset information of system 10 is embedded in a filehandle exchanged between client 40 and the administration server 305 instead of maintaining the fileset information for object at the server.

Figure 5:
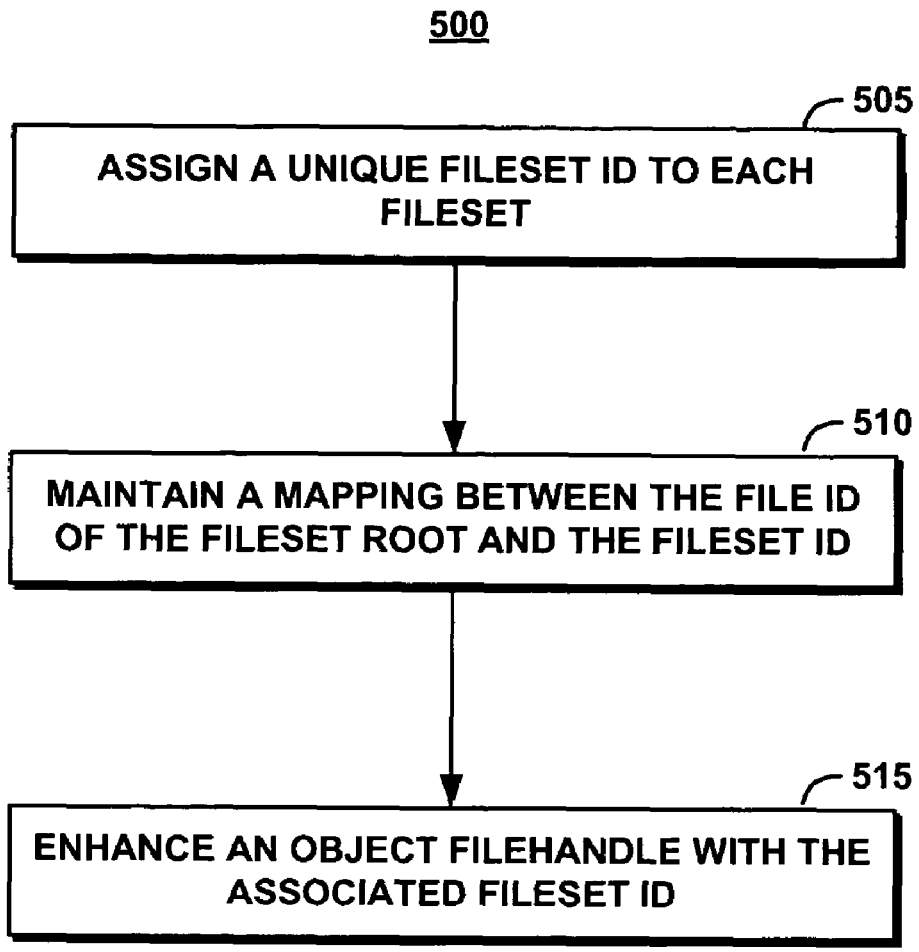
FIG. 5 is a process flow chart illustrating a method of operation of the file system boundary emulation system of FIGS. 1 and 3 in embedding fileset information in a file-handle.

FIG. 5 illustrates a method 500 of system 10 in embedding fileset information in a filehandle. Using a virtual file system, system 10 assigns a unique fileset ID to each fileset (step 505). System 10 maintains a mapping between the file ID of the fileset root and the fileset ID (step 510). System 10 enhances an object filehandle with the associated fileset ID (step 515). Client 40 later returns the filehandle containing the embedded fileset ID in a PUTFH call.

Figure 6:
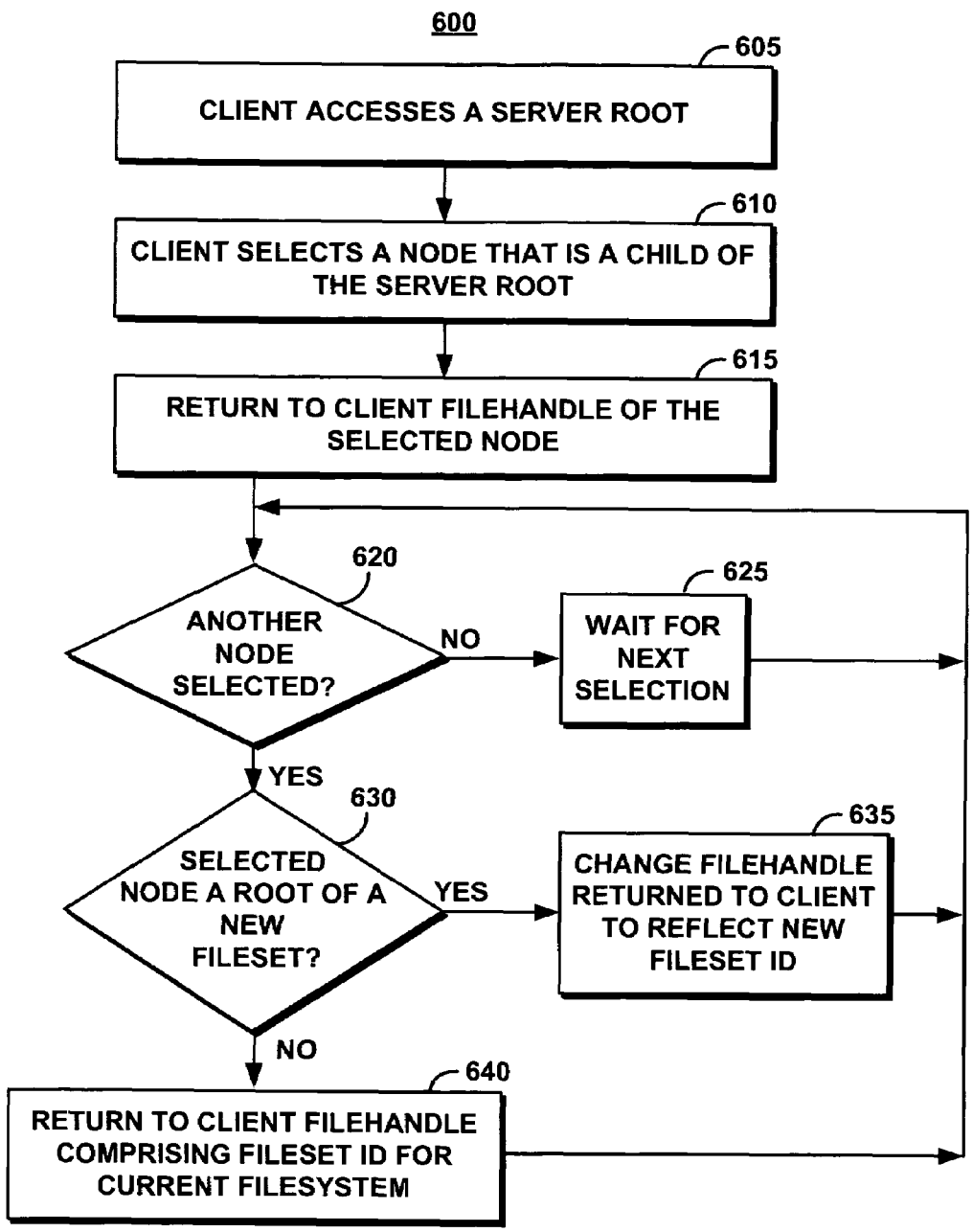
FIG. 6 is a process flow chart illustrating a method of operation of the file system boundary emulation system of FIGS. 1 and 3 in traversing a directory tree and identifying a virtual boundary in the directory tree.

FIG. 6 illustrates a method 600 of client 40 traversing a directory tree and identifying an emulated or virtual boundary. Client 40 can only access an object by traversing the directory tree leading up to the object from the server root. Client 40 accesses a server root (step 605). Client 40 selects a node that is a child of the server root (step 610). System 10 returns to client 40 the filehandle of the selected node (step 615). System 10 determines whether client 40 has selected another node (decision step 620). If not, system 10 waits for a next selection by client 40 (step 625).

If the client selects another node, i.e., a child of the selected node (decision step 620), system 10 determines whether the selected node is a root of a new fileset (decision step 630). If yes, system 10 changes the filehandle returned to client 40 to reflect the new fileset ID (step 635). Otherwise, the filehandle returned to client 40 reflects the fileset ID of the prior node traversed by client 40 (step 640). The fileset ID passes through the successive filehandles that are exchanged between client 40 and the administration server 305. Whenever client 40 steps into a directory that is the root of new fileset, the filehandle is changed to reflect the new fileset ID. On a GETATTR file server ID request by client 40, the associated fileset ID is used to create a unique file server ID value that is returned to client 40.

Operations affected by system 10 comprise GETFH, PUTFH, LOOKUP, GETATTR, LOOKUP, SAVEFH, RESTOREFH, PUTROOTFH, PUTPUBFH, OPEN, READDIR, RENAME, and LINK. The effect of supporting fine-grained filesets on the handling by system 10 of various file system operations is summarized as follows.

GETFH: The administration server 305 embeds the fileset ID associated with an object in the filehandle that is returned to client 40. The fileset ID is either received in an incoming filehandle (from the earlier PUTFH call) or newly created if the current object happens to be the root of a fileset.

PUTFH: The fileset ID in the incoming filehandle is stored as the default value for the current object.

LOOKUP: The current object is checked against a mapping table to determine if the current object is the root of a fileset. If no entry exists, the default value that was set by the PUTFH operation is used. If additional LOOKUPS are requested in a COMPOUND request, the fileset ID flows through appropriately.

GETATTR: The affected attributes in a GETATTR request comprise ATTR_FILEHANDLE and ATTR_FSID.

LOOKUPP: Requires location of the fileset ID of the parent directory. The parent directory may belong to a different fileset; consequently, the default value cannot be used.

For operations such as SAVEFH, RESTOREFH, PUTROOTFH, PUTPUBFH, OPEN, and READDIR, system 10 manages the fileset ID appropriately in a manner similar to previously discussed operations. For operations such as RENAME or LINK, system 10 returns an error such as, for example, the NFS4ERR_XDEV error, when a rename or hard link crosses a fileset boundary.

System 10 provides the necessary support to handle fine-grained filesets. System 10 further determines when a fileset can be defined. In the simplest case, filesets are managed in an administrative task before the administration server 305 is online (i.e., before filesystems are exported). In this case, client 40 does not have any state (e.g., filehandles) associated with the objects in a fileset and can be provided a "virtual" file server ID whenever client 40 crosses a fileset boundary. The filesets can be static, provided the server is online.

For an operational system with rare down times, it is not always prudent to take the administrative server 305 offline for any customer-desired changes in fileset boundaries. Consequently, system 10 comprises a flexibility of dynamic filesets. New fileset boundaries can be established after the administration server 305 is online and client 40 has previously accessed data. An existing directory in an exported filesystem can be "promoted" to be the root of a new fileset. In this case, it is desired that there are no existing hard links that cross the new fileset boundary. If a new directory is created and marked as a fileset, the new directory is similar to a static fileset, as the client has no state associated with it.

Dynamic promotion requires expiration of filehandles of objects that client 40 has previously seen that now belong to a new fileset. System 10 accomplishes expiration by, for example, returning a NFS4ERRYHEXPIRED error. To expire filehandles, system 10 relaxes the persistence attribute of filehandles. The administration server 305 indicates to client 40 that filehandles are volatile. Consequently, client 40 can prepare to maintain the necessary state required to rebuild the filehandles on expiration.

Filehandle expiration is generally expensive. Consequently, the administration server 305 determines which filehandles need to be expired to prevent expiring all filehandles. The fileset information is carried in the filehandle; the administration server 305 cannot determine which filehandles belong to the new fileset without traversing up the tree. To manage expirations, system 10 attaches a generation number to each fileset. Whenever a new fileset is promoted, the generation number of an associated parent fileset is incremented. This generation number is also embedded in the filehandle along with the fileset ID. Whenever the administration server 305 is presented with a filehandle that has a valid fileset ID, the administration server 305 checks the validity of the corresponding fileset generation. If the generation is not current, the filehandle is expired. In this manner, the filehandle expiration is contained within the outer fileset. A similar approach is taken when a fileset is demoted. In this case, however, expiration can be limited to the demoted fileset only.

Replica filesets are read-only; only the original fileset are read-write. Any operation that results in a modification at the replica fileset further results in an error message. Replica consistency is administratively controlled; i.e., an administrator can specify when, and how often, a replica needs to be updated. For example, a replica can be a daily backup of the original fileset. In this case, the replica update mechanisms comprise taking a snapshot of the source fileset at a specific time and updating all the replicas.

System 10 manages replica updates. Although replicas are read-only, they need to be modified on an update while clients may be accessing the files of an update. For consistent updates, system 10 provides snapshot support. A snapshot-based replica update requires that the filesystem snapshot be taken from the source fileset and then populated at the replica location. Clients such as client 40 are then redirected to the new snapshot while preserving the filehandles. A snapshot-based in-place replica update requires that the filesystem not only support fileset level snapshots but also guarantee that namespace of the file ID be preserved across snapshots. This ensures that client 40 sees the same filehandle and attributes for a given object that client 40 was previously accessing.

Replication in system 10 is useful for both load balancing and failure handling. For load balancing, the administration server 305 returns different server locations (i.e., the fs_locations attribute) for the directory that is the boundary of a replica fileset. The locations returned can be based on the geographic or network location of client 40, the load on the administration server 305, or a combination of other factors. To enforce load balancing, system 10 can dynamically steer client 40 to different replica locations. In such cases, client 40 handles volatile filehandles and different file ids for the same objects on a different administration server 305.

Additional replica locations are also useful to mask failures. When client 40 detects that the administration server 305 providing a replica is unresponsive or poorly performing, client 40 can connect to another administration server 305 from the list of locations for that replica. Failover behaves somewhat similar to migration except that the administration server 305 has failed and no state can be recovered.

A fileset of system 10 can be physically migrated from one administration server 305 to another. Protocol of system 10 comprises a method of providing filesystem migration with the use of the special fs_locations attribute. Migration is typically used for read-write, single copy filesystems and usually employed for load balancing and resource reallocation. For the purpose of migration, a filesystem is defined as all files that share a given file server ID. This allows a fileset of system 10 to be physically migrated from one administration server 305 to another with no noticeable impact to client applications.

Fileset migration does not impact the location transparency of the namespace. Once a fileset is migrated, the migrated fileset appears as a referral at the previous location of the fileset. All future accesses of the fileset on the original administration server 305 result in client redirection to the new location. A client 40 that did not previously communicate with the original administration server 305 or did not have cached state pertaining to files from the migrated fileset encounters a referral when traversing the namespace of the administration server 305 that includes the migrated fileset. Existing clients 40, however, potentially have outstanding state on the original administration server 305 that are transferred between the participating servers.

In one embodiment, no state is transferred to client 40. Client 40 starts afresh at the new administration server 305. If client 40 presents state information from the original administration server 305, client 40 receives stale errors. In this case, client 40 is expected to recover all state as in case of administration server 305 failure. While this is a simple approach from a point of view of the designer, it can be rather disruptive to client applications.

In another embodiment, client 40 sees a transparent migration in which all client states are transferred between instances of the administration server 305. Consequently, client 40 can continue to use the state assigned by the original administration server 305. Moreover, clients 40 can use persistent filehandles if the immigrating filesystems can recognize each filehandles of other clients 40.

In yet another embodiment, client 40 starts afresh at a new administration server 305 except for files that client 40 has open. All state pertaining to open files is migrated to the new administration server 305. While client 40 expects filehandle expiration for other files, client 40 can continue to use existing filehandles for open files on the new administration server 305. This requires the administration server 305 to recognize and service "foreign" filehandles specially. Other client state (including client ID and lease information) may also need to be migrated.

Apart from state management, migration also requires data transfer in case of single-copy read-write file systems. In one embodiment, a remote server acts as a proxy, reading the data on demand and in the background. In this case, client 40 is instantaneously redirected to a new administration server 305. All reads, writes, and metadata operations occur at the new administration server 305. Apart from the performance concerns of client 40 having to cross two instances of the administration server 305 to get the data, there are data integrity concerns. On a network partition between the two instances of the administration server 305, neither of the instances of the administration server 305 has a fully consistent copy of the fileset.

In another embodiment, data transfer is complete before redirection of client 40 occurs. However, all the updates from client 40 to the old administration server 305 cannot be delayed before the data transfer completes. System 10 uses a series of snapshots each with lesser data to be transferred. When the remaining updated data is sufficiently small, clients such as client 40 are paused until the data is moved over. Redirection of client 40 occurs after the data is moved over, maintaining data integrity.

The data management server 320 manages server-to-server data operations. These services are responsible for maintaining the configuration state for all filesets within a cell and for transferring filesets between systems.

Most fileset data management operations occur as the result of an administrative action, for example, a request to create a new fileset or to place a new copy of a replica fileset on a new administration server 305. The data management server 320 also supports the file system server 340 in responding to requests for fs_locations attribute. Since these attributes represent cell-wide information, they are the domain of the data management services.

Once a fileset exists on a host operating as an administration server 305, the administration server 305 uses the fileset services in responding to client requests. However, these services do not encompass such functions as those necessary to actually create a fileset, to migrate a fileset from one administration server 305 to another, or to make create a new location for a fileset. Fileset services of the data management server 320 provide this functionality.

Data management fileset services on the data management server 320 are implemented via a purpose-built server-to-server protocol. An agent of the data management server 320 is instantiated on every host comprising system 10. This agent is responsible for accepting requests from either an administrator or from other peer agents.

In addition to implementing fileset maintenance operations, the data management server 320 is responsible for managing fileset allocation to backing filesystem storage. When a fileset location is created, it can be created at a specific location in the local filesystem hierarchy. Optionally, allocation can be left to services of the data management server 320 that maintain a list of pools of filesystems where filesets are created if not otherwise specified.

As part of the fileset services of the data management server 320, a set of copy and replication services is provided. These copy and replication services are provided in a plug-in library that anticipates instances of the administration server 305 providing different combinations of these protocols.

A primary responsibility of the data management server 320 is movement of filesets from one administration server 305 to another administration server 305. This can happen, for example, in response to an administrative request to place a new fileset location, to update existing replica locations from a source fileset, or to migrate a fileset location from one administration server 305 to another. When placing a new replica location or migrating a fileset, a copy operation takes place. Different copy implementations exist that can provide optional compression for low bandwidth lines or no compression for higher performance where network bandwidth allows.

A data management operation is replica fileset update. In this case, a higher performance protocol is available that only transmits fileset differences between instances of the administration server 305. The protocol selection process of the data management sever 320 returns to a simple copy where an rsync protocol is not available.

To ensure that the data in a new or update replica is consistent with the state of the source at some point in time, the fileset replication represents a point-in-time copy or snapshot. Without point in time copies, the contents of the resulting fileset may not represent the contents of the source at any single time but rather a mixture of the contents of the source at different times. Whether this is acceptable or not depends on the use of the contents of the fileset.

System 10 does not implement snapshot support but can utilize that support where provided by the underlying filesystem. For example, when a fileset snapshot is requested for a fileset that exists within a filesystem providing snapshot functionality, system 10 can snapshot the entire filesystem that is sufficient (but not necessary) to snapshot the fileset location. This snapshot can then be used to populate or update a replica location. When the fileset snapshot is no longer required, it can be destroyed, at which point system 10 releases the filesystem snapshot.

The data management server 320 maintains and responds to requests for fileset location information. One source of this request is in response to a request by client 40 for the fs-locations attribute. While the kernel components of system 10 maintain the necessary information to handle fileset requests for fileset locations on the current administration server 305, the kernel does not maintain fileset information for locations not on the local administration server 305. The data management server 320 maintains a small, custom database of all locations for all filesets in the cell.

The data management server 320 provides a service for requesting location data for a given fileset. This data location service is designed with a flexible interface for selecting among possible locations. The administration server 305 has a complete list of all filesets, locations, and servers within the cell. This information can be augmented with status about server and network capacity and load, maintained via intra-cell services. The data management server 320 ranks the list of candidate replica locations and returns an ordered list of the top n candidates, where n is configured per cell. To facilitate this, some information about a request by client 40, for example, client IP address, is passed to the ranking function. From the list of locations returned to client 40, client 40 can select any of the locations in an implementation-defined manner. Some existing client implementations select an initial location and only switch to another on failures by the administration server 305. Other client implementations use a round-robin selection.

The data management server 320 is responsible for maintaining the namespace of the cell in response to administrative mount and un-mount requests. These services comprise maintaining a fileset representing the namespace and managing exports by administration server 305 of all filesets including the namespace fileset.

To implement a namespace of a cell, a read-write fileset is created and maintained (detailed description follows). This fileset exists on the administration server 305. A replica of this fileset is also created and a fileset location for this replica is placed on each data administration server 305 in the cell. This read-only replica thus becomes the root of the namespace. The data management server 320 is responsible for modifying and updating both of these filesets in response to the various administrative operations.

System 10 manages all exporting of fileset locations required for proper operation. Manual network file system exports are required. The primary export of system 10 is that of the namespace. The local location of the namespace replica fileset is exported to "/cellname" in a file system pseudo-namespace. Thus any administration server 305 in a cell can resolve the root of the namespace.

Each administration server 305 also exports all the fileset locations it contains. A fileset mount operation results in creation of a mount point in the appropriate fileset representing the root namespace. This mount point triggers the administration server 305 to respond to client 40 with a "moved" error at which point client 40 requests the fs-locations attribute. System 10 then responds with locations for this fileset, including the fs_root component. Because this component is not exposed to client 40, system 10 has complete freedom in where within the pseudo-namespace it exports filesets as long as the exports and the data in the locations attributed is consistent. System 10 exports fileset locations into a hidden directory (nominally ".hidden") in the directory that implements the cell. This makes the directory available to client 40 but not obvious to the user.

The data management server 320 is responsible for managing all fileset-related state, whether the state is in-kernel-memory state or filesystem resident state. In particular, the initializing services of the data management server 320 are used to reload kernel information after a reboot or subsystem reset and to check for fileset consistency similar to fsck.

It is to be understood that the specific embodiments of the invention that have been described are merely illustrative of certain applications of the principle of the present invention. Numerous modifications may be made to the system and method for emulating a virtual boundary of a file system for data management at a fileset granularity described herein without departing from the spirit and scope of the present invention.

What is claimed is:

1. A processor implemented method of emulating a virtual boundary of a file system for data management at a fileset granularity, wherein a file includes a filehandle that contains a file ID, a fileset ID, and a file system ID, the method comprising:

dynamically assigning a fileset ID associated with a file in the file system;

embedding fileset information in a filehandle exchanged between a client and an administration server to obviate maintaining the fileset information for an object at a file system server;

defining the fileset as the virtual boundary of the file system;

identifying the file by the file ID and the fileset ID rather than by the file ID and the file system ID;

maintaining the fileset ID to fileset root object mappings in a database outside an underlying file system server, wherein fileset ID to fileset root object mappings are file system type and are platform neutral;

implementing a namespace of a cell by creating and maintaining a read-write fileset, wherein the fileset exists on the administration server;

creating a replica of said fileset;

placing said replica on the administration server in the cell, wherein the replica thus becomes a root of the namespace;

modifying and updating said fileset in response to various administrative operations, wherein the modifying and updating is done on a data management server;

managing server to server data operations on the data management server; and maintaining a configuration state for said fileset within a cell and for transferring said fileset between a plurality of systems;

placing the fileset ID in a unique filehandle; and providing the unique filehandle to a client, to identify the file system and to reflect the crossing of the virtual boundary.

2. The method of claim of claim 1, further comprising mapping the file ID to the fileset ID.

3. The method of claim 2, further comprising assigning a unique fileset ID to each of a plurality of filesets contained in the file system.

4. The method of claim 3, further comprising maintaining a mapping between the fileset ID and a file ID of a fileset root of each of the filesets.

5. The method of claim 3, further comprising identifying a virtual boundary of the filesets; and wherein the virtual boundary of the filesets is smaller than, and contained within the file system.

* * * * *